United States Patent [19]
Pineda

[11] Patent Number: 5,603,439
[45] Date of Patent: Feb. 18, 1997

[54] TRUCK CARGO ORGANIZER

[76] Inventor: Adrian R. Pineda, 1703 Quenon Ct., Jarrettsville, Md. 21084

[21] Appl. No.: 422,922

[22] Filed: Apr. 17, 1995

[51] Int. Cl.⁶ ..................................................... B60R 11/00
[52] U.S. Cl. .......................... 224/403; 224/281; 224/551
[58] Field of Search .................................. 224/403, 404, 224/281, 542, 539, 551

[56] References Cited

U.S. PATENT DOCUMENTS

| | | | |
|---|---|---|---|
| 4,573,731 | 3/1986 | Knaack et al. | 224/404 X |
| 4,842,175 | 6/1989 | Towsend | 224/542 X |
| 4,994,544 | 7/1990 | Dick | 224/542 X |
| 5,469,999 | 11/1995 | Phirippidis | 224/542 |

*Primary Examiner*—Renee S. Luebke
*Attorney, Agent, or Firm*—Terrance L. Siemens

[57] ABSTRACT

A truck cargo area organizer is presented for carrying a multiplicity of small loads in an orderly fashion, made to fit snugly within the inside dimensions of a truck cargo area, within the space available between the two vehicle wheel wells, The organizer has one fixed outer frame, and an inner drawer frame, the latter being capable of sliding within the outer frame. In addition, there are several separators or dividers for compartmentalizing the loads, with several sub-separators, smaller in dimension, to further divide the load area into an orderly array of small loads.

5 Claims, 3 Drawing Sheets

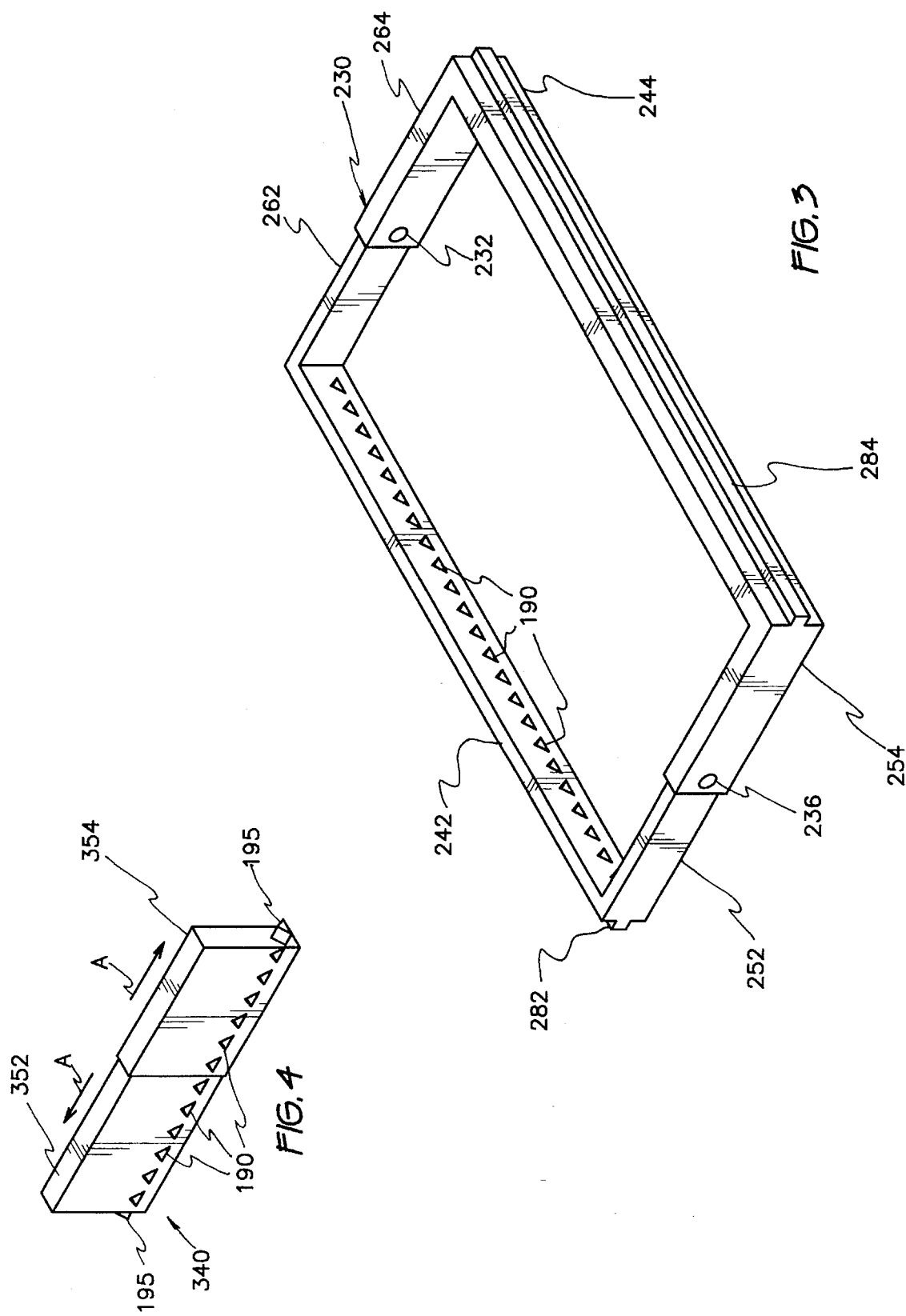

TRUCK CARGO ORGANIZER

BACKGROUND OF THE INVENTION

1. Field of the Invention

The present invention relates to the field of pickup truck cargo load distribution and organization. Pick up trucks or vans carrying their cargo loads on their open-top bed areas see their loads arriving at destination in a pell-mell fashion, as a result of truck movement through traffic thrashing the load left and right, front and rear. When the truck arrives at destination it becomes difficult for the driver to disentangle one load item from the other, especially if the load items are loose items, small bags, or are boxes which end up with their covers removed. The present invention relates to a device for putting an end to this lack of organized load arrangement. It is designed to provide a device conceived for organizing these load items into a plurality of compartments, arrayed in an orderly matrix, and adjusted to fit the size of a truck open top bed, or on the floor of a van, or in a smaller size version, on the seat of a truck or van. In the case of a pickup truck, for example, a tonneau cover can be laid on top of the pickup cargo area to further protect the load items from rain, wind or snow, and the device can be conveniently made to slide underneath the tonneau cover. The device can be used by any professional trucker, by electricians, plumbers and the like, and by any homemaker carrying a cargo of diverse contents.

Thus it can be seen that the potential fields of use for this invention are manifold; consequently, the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Devices for carrying and organizing truck bed load areas are old and well known in the art. Several such devices are mentioned in the prior art literature, as will be shown below but, as will be seen, the simplicity and effectiveness of my invention is not rivaled in the prior art.

U.S. Pat. No. 4,507,033, issued to Walter K. Boyd on Mar. 26, 1985, shows a load securing apparatus for a cargo carrying vehicle. It shows a first and a second side rails mounted on the side walls of the open top truck bed, and a first and second retainers attached to the side rails. The retainers are adjusted to be in an erect position inside the truck bed, so as to retain and secure the load and to prevent the load from being thrashed about in the truck bed. The patented device presents therefore two or three major compartments. By contrast, my invention has a much simpler arrangement for arraying a multiplicity of compartments of adjustable dimensions.

U.S. Pat. No. 4,717,298, issued to John A. Bott on Jan. 5, 1988, shows a cargo restraint system. It provides a pair of longitudinal grooves for mounting vertical stops for butting against cargo elements, so as to prevent the movement of these elements inside the cargo bed area. By contrast, the device of the instant invention does not require slots for installation on a truck cargo bed area, but provides instead a multiplicity of compartments for organizing a diverse load on a truck bed floor or on a vehicle seat.

U.S. Pat. No. 4,733,899, issued to Orbtie L. Keys on Mar. 29, 1988, shows a pickup truck-bed divider device. The patented device teaches a divider device mountable on a truck bed from one side wall of the bed to the other, so as to provide at least one compartment. The device is mounted without attachment to the truck, so that it may be freely removed, or moved to a different position on the truck bed. By contrast, the device of the instant invention is semi-permanently attached to the inside of a truck or van bed, and has a multiplicity of adjustable and small compartments.

A truck bed load organizer and stabilizer apparatus is the subject of U.S. Pat. No. 4,875,730, issued to Kendall W. Justice on Oct. 24, 1989. The patent shows a plurality of transverse panels which are made to pivot from a down position to an up position. The panels thus erected prevent the movement of loads about the truck bed. The panels are otherwise retracted flush with the floor of the truck bed when not in an erect position for use. By contrast, the device of the instant invention has a plurality of small compartments adjustable in sizes and numbers, with the primary purpose of distributing and organizing the small load parcels in an orderly array for easy sorting and subsequent searching.

U.S. Pat. No. 5,154,478, issued to Glenn P. Erickson on Oct. 13, 1992, shows a removable liner for pickup box. The already patented device offers storage compartments arranged alongside each of the two side walls and along the front wall of the cargo area. The liner can be removed from the truck bed by means of jacks and left standing outside the truck when not needed. By contrast, the instant invention presents a device which is much lighter and therefore can easily be removed, and which is divided into a plurality of small adjustable compartments.

Finally, U.S. Pat. No. 336,063, issued to Robert C. Stallings on Jun. 1, 1993, shows a combined pickup truck bed liner and tool storage container design. The liner is made to fit the cargo area of a pickup truck, and is removable. The primary role of this design is to provide an integral liner and tool storage pair of compartments, mounted against the front wall of the cargo area. By contrast, the device presented by the instant invention is not a liner, but is instead a system of small compartments arrayed for organizing small loads carried in the cargo area.

None of the above inventions and patents, taken either singly or in combination, is seen to describe the instant invention as claimed.

SUMMARY OF THE INVENTION

Briefly, in this invention the device, which can be made of metal or plastic material, comprises an outer frame, adjustable in width, by having telescoping transverse members; an inner smaller drawer frame, similarly adjustable in width, and dimensioned so that it can slide inside the outer frame by a tongue-and-groove arrangement; and several main separators or dividers, made to fit snugly each one between a pair of receiving notches inside the inner frame. The main separators are also adjustable in length, by a telescoping arrangement of their two halves, to fit within the inner frame dimensions. In addition, further smaller sub-separators or sub-dividers can be made to fit within the main separators, to further compartmentalize the whole structure. The total combination of outer frame, inner frame and main separators and smaller sub-separators or sub-dividers are made to rest on top of the floor of a truck bed, for example, and to fit within the space available between the two wheel wells, by having on either side of the outer frame, and jutting out of its outside dimensions, a set of two heavy screws that butt against the side walls of the vehicle bed, and that can be tightened against these walls in order to lock the organizer strongly in place.

Accordingly, it is a principal object of the invention to provide a new and improved organizer device which overcomes the disadvantages of the prior art in a simple but effective manner.

It is a major object of this invention to provide a means for carrying an array of small loads, so as to avoid intermixing of the load contents during vehicle movement through traffic.

It is another object of the invention to provide a device for organizing small loads inside a vehicle, in order to avoid the thrashing of these small loads, and to prevent an otherwise dangerous situation from developing when brakes are suddenly applied by the driver.

It is another object of the invention to provide an organizer device made to fit within the wheel wells of an open top pickup cargo area, or of a van cargo area, the organizer being made into a outer frame and inner drawer frame arrangement, wherein the drawer frame can slide easily within the outer frame, and an additional array of main separators or dividers and smaller sub-separators are made to fit inside the dimensions of the inner drawer frame, in order to provide an orderly and easily accessible arrangement of small loads carried by the vehicle.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is an isometric view of the inner drawer frame.

FIG. 4 is an isometric view of a separator or divider.

DETAILED DESCRIPTION OF THE PREFERRED EMBODIMENT

Figure 1:
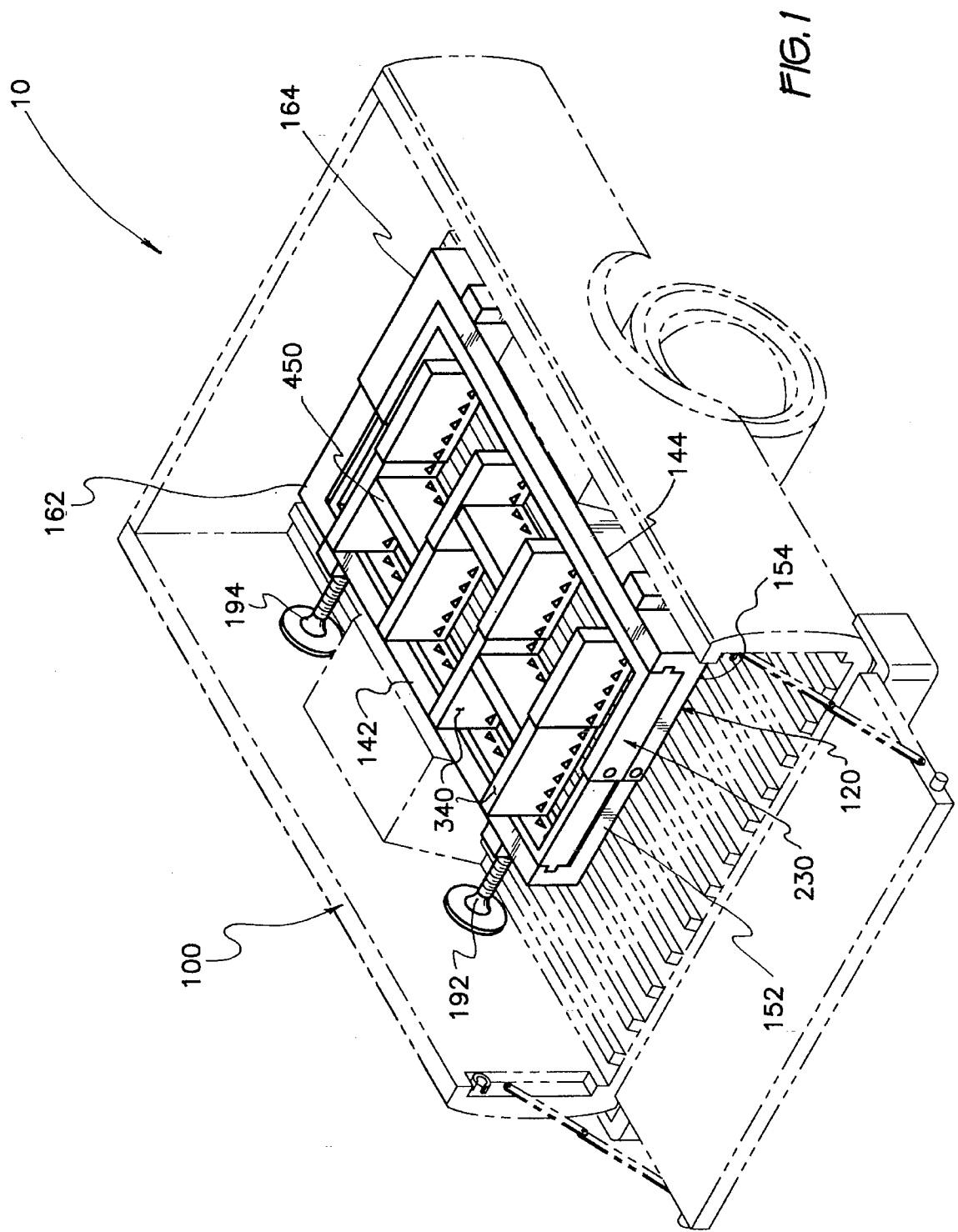
FIG. 1 is an environmental perspective view of the preferred embodiment of the invention, installed inside the open top bed of a pickup truck.
Figure 2:
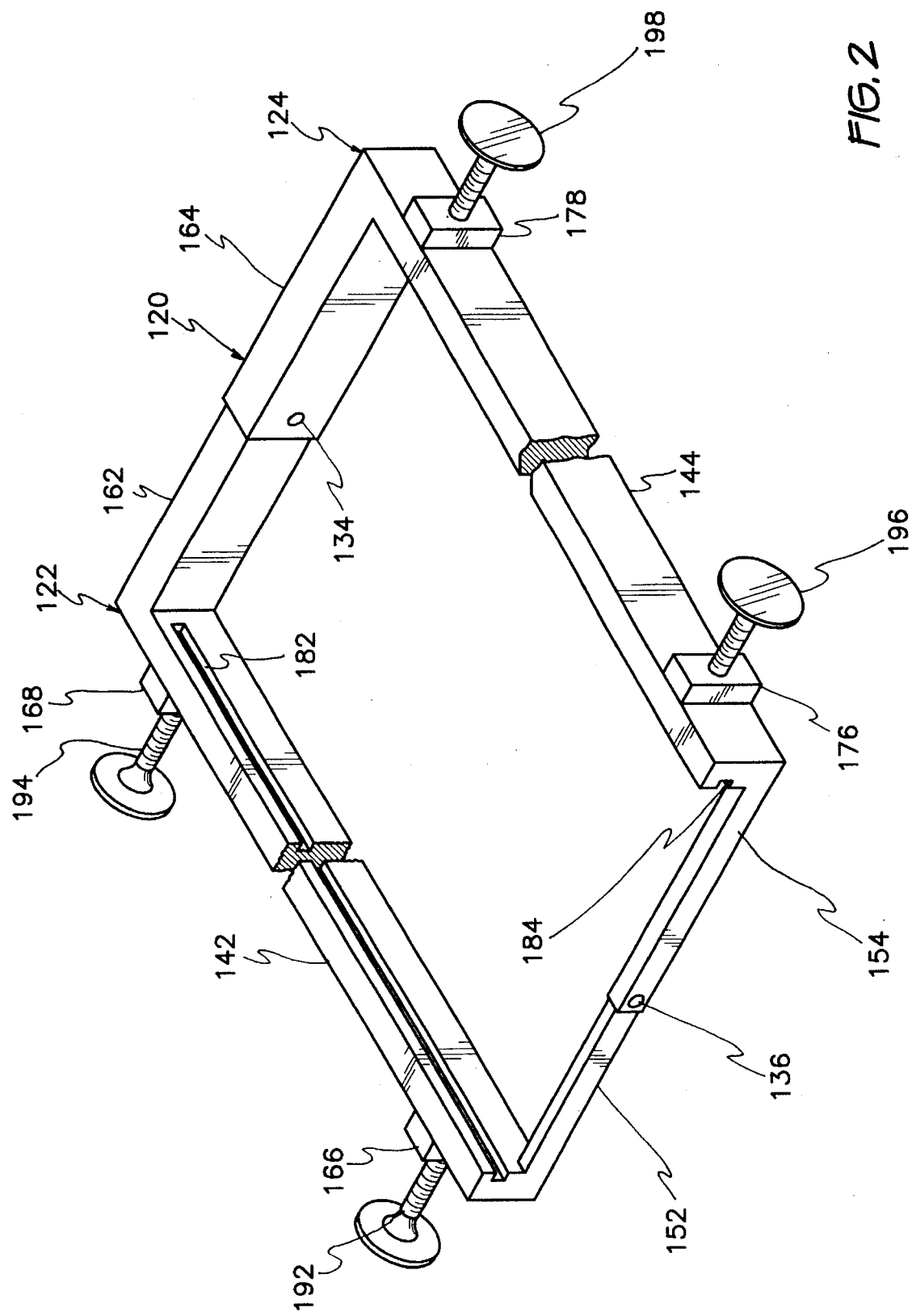
FIG. 2 is an isometric view of the outer frame.

The truck cargo organizer of the present invention is generally designated by 10 in FIG. 1. The device is made to fit on the floor of a pickup truck cargo area, well within the space available between the wheel wells of the cargo area. A typical pickup truck bed 100 is shown in phantom lines in FIG. 1. It is to be understood from the outset that the device is not limited for use in the bed of a pickup truck. Rather, it could be adapted for use in any normal cargo area of any vehicle, such as on the rear seat of a passenger car or in the rear area of a mini-van.

The device comprises the following main parts: an outer frame 120, an inner drawer frame 230, several main separators or dividers 340, and a number of smaller sub-separators or sub-dividers 450, similar to the main separators 340, but smaller in dimension.

The outer frame 120 has two halves 122 and 124, where the left half 122 is shown as telescoped inside the right half 124, with two screws 134 and 136 securing the two halves. Two longitudinal members, 142 and 144, connect at right angles with cross member halves 152 and 154 in the front, 162 and 164 in the rear of the device. A front 152, 154 of the device faces the rear of the vehicle, and a rear 162, 164 of the device faces a front wall of the truck bed 100. Rear cross member halves 162 and 164 have the same thickness as longitudinal members 142 and 144. Front cross member halves 152 and 154 are thinner than longitudinal members 142 and 144, to let the inner drawer frame 230 slide into outer frame 120. On the outside of the longitudinal member 142 are a pair of protrusions 166, 168. On the outside of the longitudinal member 144 are a similar protrusions 176, 168. Fixed in each protrusion are single screws, long enough to jut out and reach a side wall of the pickup truck bed 100 or other cargo area. Four such screws are shown as 192, 194, 196 and 198. The screws have heads suitable for tightening the outer frame of the device against the inner side of the vehicle side walls. In the case of a pickup truck bed, the screws straddle the wheel wells of the truck bed. In addition, a pair of grooves 182 and 184 run longitudinally along the inside edge of the length of the two longitudinal members 142 and 144, to accept a pair of matching lips 282 and 284 belonging to the longitudinal members 242 and 244 of the inner drawer frame 230 (See FIG. 3).

The inner drawer frame 230 has two screws 232 and 236 holding in place telescoping cross member halves 252, 254 in the front, and 262, 264 in the rear of the device. The inner drawer frame can have a thin board, not shown, securely anchored to its bottom, and capable of withstanding the weight of the total load carried by the device, so that the load elements are prevented from falling down when the inner drawer frame is pulled for loading or for servicing of the device.

Longitudinal members 242 and 244 of inner drawer frame 230 have multiple female notches 190 along the inside thereof. In a preferred embodiment of the device, each notch 190 is triangularly shaped, to accept a complementary male plug 195 belonging to a separator 340, shown in FIG. 4. The artisan will understand that the particular shape of the complementary plugs and notches could be any suitable form which would tend to prevent rotation of separator 340 about the axis of the plugs 195.

The separators 340 are sized to fit the inner dimensions of the inner drawer frame 230, and run the width of the inner drawer frame, i.e., parallel to the width of the vehicle. They are formed from two telescoping halves 352, 354, and spring loaded so as to butt strongly against the inside dimension of the inner drawer frame 230, as shown by arrows A in FIG. 4. In addition, each main separator has, a row of spaced notches suitable for accepting pairs of plugs on either end of smaller sub-separators. There are several such smaller sub-separators, such as 450, shown in FIG. 1. The sub-separators 450 are similar to the main separators 340, but smaller in size. The smaller sub-separators 450 fit perpendicularly to the main separators, i.e., they are parallel to the length of the vehicle. The smaller sub-separators 450 may have notches cut in them to fit even smaller separators. Alternately, they may be made without notches if no further sub-division of the cargo area is desired.

In use, the driver of the vehicle first installs the outer frame on the bed of the cargo area, then tightens the four screws holding it against the side walls, in front of and behind the wheel wells, then slides the inner drawer into the grooves of the outer frame. The user then installs a few main separators at selected locations, by squeezing the two halves of each main separator to fit between a pair of notches in the inner drawer frame. The user finally installs in a similar fashion several smaller sub-separators, in selected locations, between the main separators.

From the foregoing description, one skilled in the art can easily ascertain the essential characteristics of this invention and, without departing from the spirit and scope thereof, can make various changes and modifications of the invention to adapt it to various usages and conditions. For example, the artisan could easily adapt a similar design to fit a small box for organizing and sorting screws, nuts, nails and other small parts commonly available in machine shops.

It is to be understood that the present invention is not limited to the sole embodiment described above, but encompasses any and all embodiments within the scope of the following claims:

I claim:

1. An organizer for use in a vehicle load cargo area, having a length, a width, and two side walls, said organizer comprising:

an outer frame having means for adjusting to fit between the side walls of the cargo area and comprising two longitudinal rails and two cross ties rigidly attached at right angles to said longitudinal rails, each said cross tie further comprising two telescopically interfitting halves, whereby said cross ties are adjustable in length, and a threaded fastener for uniting said halves of said cross tie into a single, rigid unit, said outer frame further having at least four screws projecting laterally from said outer frame toward the side walls of the cargo area, for engaging the side walls to secure said outer frame within the cargo area;

an inner drawer frame, having means for adjusting to slide inside of said outer frame, a plurality of main separators dimensioned and configured to fit inside said inner drawer frame, and a plurality of small sub-separators dimensioned and configured to fit within the spaces available between said main separators.

2. The organizer of claim 1, wherein said inner drawer frame is formed as two telescopically interfitting halves, whereby said inner drawer frame has two longitudinal members, and a threaded fastener disposed to unite said two halves of said cross members of said inner drawer frame in fixed relationship to one another, whereby said inner drawer frame is adjustable with respect to the side walls of the cargo area.

3. The organizer of claim 2, wherein said outer frame has a longitudinal groove disposed inside each of its two said longitudinal rails, said longitudinal groove extending the length of said outer frame, and said inner drawer frame has one longitudinal lip disposed on each one of the outer surfaces of its said longitudinal members, and said longitudinal grooves in said outer frame cooperate with, in a tongue-and-groove fashion, said longitudinal lips of said inner drawer frame, so that said inner drawer frame can slide within said outer frame.

4. The organizer of claim 3, wherein said inner drawer frame has a plurality of female notches cut into said longitudinal members at the inside surfaces of said longitudinal members, each said main separator being formed as two telescoping halves having spring means urging said two telescoping halves apart, each said main separator having a projection cooperatively interfitting within and alignable with each said notch formed in said longitudinal members of said inner drawer frame.

5. The organizer of claim 4, wherein each said main separator has also a plurality of female notches, periodically arranged to receive matching plugs belonging to said smaller sub-separators, each said smaller sub-separator having at least two plugs matching said female notches of each said main separator in interfitting cooperation, whereby said main separators may be further sub-divided by said smaller sub-separators.

* * * * *